US008811338B2

(12) United States Patent
Jin et al.

(10) Patent No.: US 8,811,338 B2
(45) Date of Patent: Aug. 19, 2014

(54) PROXY MOBILE INTERNET PROTOCOL (PMIP) IN A MULTI-INTERFACE COMMUNICATION ENVIRONMENT

(75) Inventors: Haipeng Jin, San Diego, CA (US); Patrick Stupar, Bavaria (DE); Gerardo Giaretta, San Diego, CA (US); Arungundram C. Mahendran, San Diego, CA (US); George Cherian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 457 days.

(21) Appl. No.: 12/544,478

(22) Filed: Aug. 20, 2009

(65) Prior Publication Data

US 2010/0080172 A1 Apr. 1, 2010

Related U.S. Application Data

(60) Provisional application No. 61/091,280, filed on Aug. 22, 2008, provisional application No. 61/091,283, filed on Aug. 22, 2008.

(51) Int. Cl.
*H04Q 7/00* (2006.01)
*H04L 12/28* (2006.01)
*H04W 36/00* (2009.01)
*H04W 28/02* (2009.01)
*H04W 8/08* (2009.01)

(52) U.S. Cl.
CPC ...... *H04W 36/0044* (2013.01); *H04W 28/0263* (2013.01); *H04W 28/0268* (2013.01); *H04W 8/08* (2013.01)
USPC ........................ 370/331; 370/395.21; 370/401

(58) Field of Classification Search
None
See application file for complete search history.

(56) References Cited

U.S. PATENT DOCUMENTS

| 8,041,022 | B1* | 10/2011 | Andreasen et al. | 379/221.1 |
|---|---|---|---|---|
| 8,077,681 | B2 | 12/2011 | Ahmavaara et al. | |
| 2009/0040964 | A1* | 2/2009 | Zhao et al. | 370/328 |
| 2009/0129342 | A1* | 5/2009 | Hwang et al. | 370/331 |
| 2009/0207808 | A1* | 8/2009 | McCann et al. | 370/331 |
| 2009/0285183 | A1* | 11/2009 | Wu et al. | 370/331 |
| 2010/0159934 | A1* | 6/2010 | Forssell | 455/437 |
| 2010/0250753 | A1* | 9/2010 | Song et al. | 709/227 |
| 2011/0191494 | A1* | 8/2011 | Turanyi et al. | 709/242 |

FOREIGN PATENT DOCUMENTS

| CN | 101043727 A | 9/2007 |
|---|---|---|
| CN | 101084686 A | 12/2007 |
| JP | 2010512702 A | 4/2010 |

(Continued)

OTHER PUBLICATIONS

International Search Report and Written Opinion—PCT/US2009/054693, International Search Authority—European Patent Office—Nov. 16, 2009.

(Continued)

*Primary Examiner* — Christine Duong
(74) *Attorney, Agent, or Firm* — Michael F. Taveira

(57) ABSTRACT

A communication entity (such as a User Equipment (UE), an Access Gateway (AGW), a Packet Data Network Gateway (PGW), a Policy Charging Rule Function (PCRF), and so forth) notifies another communication entity that the UE intends to use a single Internet Protocol (IP) address for connections to multiple AGWs. The communication entity also sends information that is related to at least one of the UE's IP flows to another communication entity.

50 Claims, 8 Drawing Sheets

(56) References Cited

FOREIGN PATENT DOCUMENTS

| RU | 2304856 C2 | 8/2007 |
|---|---|---|
| WO | 2007092617 | 8/2007 |
| WO | WO2008070869 A2 | 6/2008 |
| WO | WO2008071276 A1 | 6/2008 |
| WO | WO2008088271 A1 | 7/2008 |
| WO | WO2009068075 A1 | 6/2009 |

OTHER PUBLICATIONS

Jeyatharan C., et al.,"Multiple Interfaced Mobile Nodes in NetLMM; draft-jeyatharannetlmm-multi-interface-ps-02.txt ",Internet Engineering Task Force, IETF; StandardWorkingDraft, Internet Society (ISOC) 4, rue des Falaises CH- 1205 Geneva, Switzerland, Jun. 17, 2008, XP015059247.

M. Jeyatharan, et al., "Multihoming Problem Statement in NetLMM; draft-jeyatharannetext-multihoming-ps-02", NetExt Working Group, Internet-Draft, Mar. 9, 2009, 16 pages.

Soliman Elevate Technologies N Montavont IT/Telecom Bretagne N Fikouras K Kuladinithi University of Bremen H: "Flow Bindings in Mobile IPv6 and Nemo Basic Support; draft-ietf-mext-flow-binding-00.txt", Flow Bindings in Mobile IPV6 and Nemo Basic Support; Draft-IETF-Mext-Flow-Binding-00.Txt, Internet Engineering Task Force, IETF; Standardworkingdraft, Internet Society (ISOC) 4, Rue Des Falaises CH- 1205 Geneva, Switzerland, vol. mext, May 16, 2008, XP015058488.

Wakikawa R et al., "Multiple Care-of Addresses Registration; draft-ietf-monami6-multiplecoa-14.txt" May 27, 2009, 45 pages.

Zhao X, et al., "Flexible Network Support for Mobility", MOBICOM '98. Proceedings of the 4th Annual ACM/IEEE International Conference on Mobile Computing and Networking. Dallas, TX, Oct. 25-30, 1998; [Annual ACM/IEEE International Conference on Mobile Computing and Networking], New York, NY : ACM, US, Oct. 25, 1998, pp. 145-156, XP000850264, DOI: DOI:10.1145/288235.288274 ISBN: 978-1-58113-035-5.

Taiwan Search Report—TW098128427—TIPO—Oct. 23, 2013.

Wakikawa et al., "Multiple Care-of Addresses Registration", Internet Engineering Task Force (IETF): MEXT Working Group, 08, p. 44, May 30, 2008, http://tools.ietf.org/pdf/draft-ietf-monami6-multiplecoa-08.txt.

Wakikawa R., et.al., "Multiple Care-of Addresses Registration: draft-ietf-monami6-multiplecoa-02.txt", Internet-Draft, Mar. 5, 2007,URL,http://www.watersprings.org/pub/id/draft-ietf monami6-multiplecoa-02.txt.

* cited by examiner

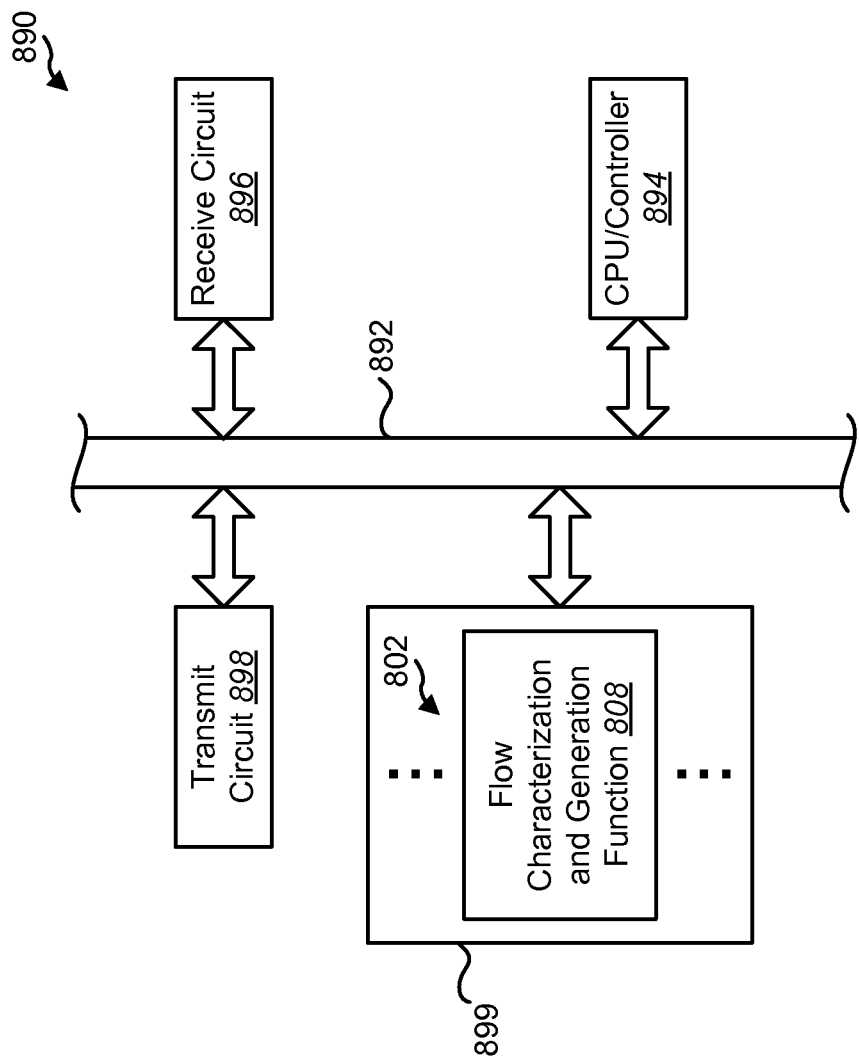

PROXY MOBILE INTERNET PROTOCOL (PMIP) IN A MULTI-INTERFACE COMMUNICATION ENVIRONMENT

CROSS-REFERENCE TO RELATED APPLICATIONS

This application is related to and claims priority from U.S. Provisional Application Ser. No. 61/091,280, filed Aug. 22, 2008, entitled "Proxy Mobile Internet Protocol (PMIP) In A Multi-Interface Communication Environment;" and U.S. Provisional Application Ser. No. 61/091,283, filed Aug. 22, 2008, entitled "Multi-Homing Attachment And Proxy Mobil Internet Protocol (PMIP);" all are incorporated herein by reference.

TECHNICAL FIELD

The present disclosure relates generally to wireless communication systems. More specifically, the present disclosure relates to wireless communication systems that implement communication protocols that are related to facilitating mobility, such as Mobile IP, Proxy Mobile IP, etc.

BACKGROUND

Wireless communication systems have become an important means by which many people worldwide have come to communicate. A wireless communication system may provide communication for a number of mobile devices, each of which may be serviced by a base station.

Mobile IP, as promulgated by the Internet Engineering Task Force (IETF), is a communications protocol that is designed to allow mobile device users to move from one network to another while maintaining a permanent IP address. Mobile IP may be found in wireless environments where users carry their mobile devices across multiple access networks. For example, Mobile IP may be used while roaming between overlapping wireless systems, for example IP over wireless LAN (WLAN), High Rate Packet Data (HRPD), Long Term Evolution (LTE), etc. In the context of Mobile IP, a mobile device may be referred to as a mobile node.

The most recent version of Mobile IP is Mobile IP version 6 (MIPv6), as described in IETF's Request for Comments (RFC) 3775. In accordance with MIPv6, when a mobile node leaves one access network and connects to another access network (referred to herein as the new access network), it receives a care-of address from the new access network. The mobile node then sends a binding update to its home agent, which is at a fixed place in the Internet (e.g., at the mobile node's home network). The binding update causes the home agent to bind the mobile node's home address with its current care-of address. Packets sent to the mobile node's home address are routed to the home agent, and the home agent tunnels those packets to the mobile node's care-of address.

Proxy MIPv6 (PMIPv6) is a variant of MIPv6 where the mobile node is not involved in the signaling. PMIPv6 uses mobility access gateways in the network to proxy MIPv6 signaling on behalf of the mobile node, as the mobile node moves from one mobility access gateway to the next. The mobile node's home network includes a local mobility anchor, which is similar to the home agent in MIPv6. When a mobile node leaves one access network, it attaches to a new access network and a corresponding mobility access gateway. The new mobility access gateway sends a proxy binding update to the local mobility anchor, which binds the mobile node's home address with its current mobility access gateway. Packets sent to the mobile node's home address are routed to the local mobility anchor, and the local mobility anchor tunnels those packets to the mobility access gateway. The mobility access gateway then delivers the packets to the mobile node.

BRIEF DESCRIPTION OF THE DRAWINGS

FIG. 8 shows part of a hardware implementation of an apparatus for executing the IP flow mobility methods disclosed herein.

DETAILED DESCRIPTION

At least some aspects of the present disclosure relate to a wireless communication network in which Proxy Mobile IP is used. A wireless device may have multiple interfaces associated with different technologies, such as an LTE interface, a Wireless Local Area Network (WLAN) interface, a WiMAX interface, and so forth. In addition, a wireless device may be participating in multiple IP sessions at the same time, such as a Voice over IP (VoIP) session, a data downloading session, a data browsing session, and so forth. A single IP address may be used for the multiple IP sessions. The present disclosure provides techniques for facilitating selective switching of multiple sessions among different interfaces, where a single IP address is used for the multiple sessions. For example, in accordance with the present disclosure, at least one IP session may be switched from a first interface to a second interface, while keeping one or more other IP sessions with the first interface. To facilitate such selective switching, different entities within the network (such as an access gateway, a packet data network gateway, a policy charging rule function, and so forth) may be provided with routing information that is related to specific IP flows that are associated with the wireless device. Such information may be provided by extending protocols that are used to set up quality of service (QoS) and IP configurations.

In the following description, for reasons of conciseness and clarity, terminology associated with the LTE standards, as promulgated under the 3rd Generation Partnership Project (3GPP) by the International Telecommunication Union (ITU), is used. It should be noted that the invention is also applicable to other technologies, such as technologies and the associated standards related to Code Division Multiple Access (CDMA), Time Division Multiple Access (TDMA), Frequency Division Multiple Access (FDMA), Orthogonal Frequency Division Multiple Access (OFDMA) and so forth. Terminologies associated with different technologies can vary. For example, depending on the technology considered, a wireless device can sometimes be called a user equipment, a mobile station, a mobile terminal, a subscriber unit, an access terminal, etc., to name just a few. Likewise, a base station can sometimes be called an access point, a Node B, an evolved Node B, and so forth. Other nodes referenced herein (such as an access gateway, a packet data network gateway, a policy charging rule function, and so forth) may also be referred to by other names. It here should be noted that different terminologies apply to different technologies when applicable.

Figure 1:
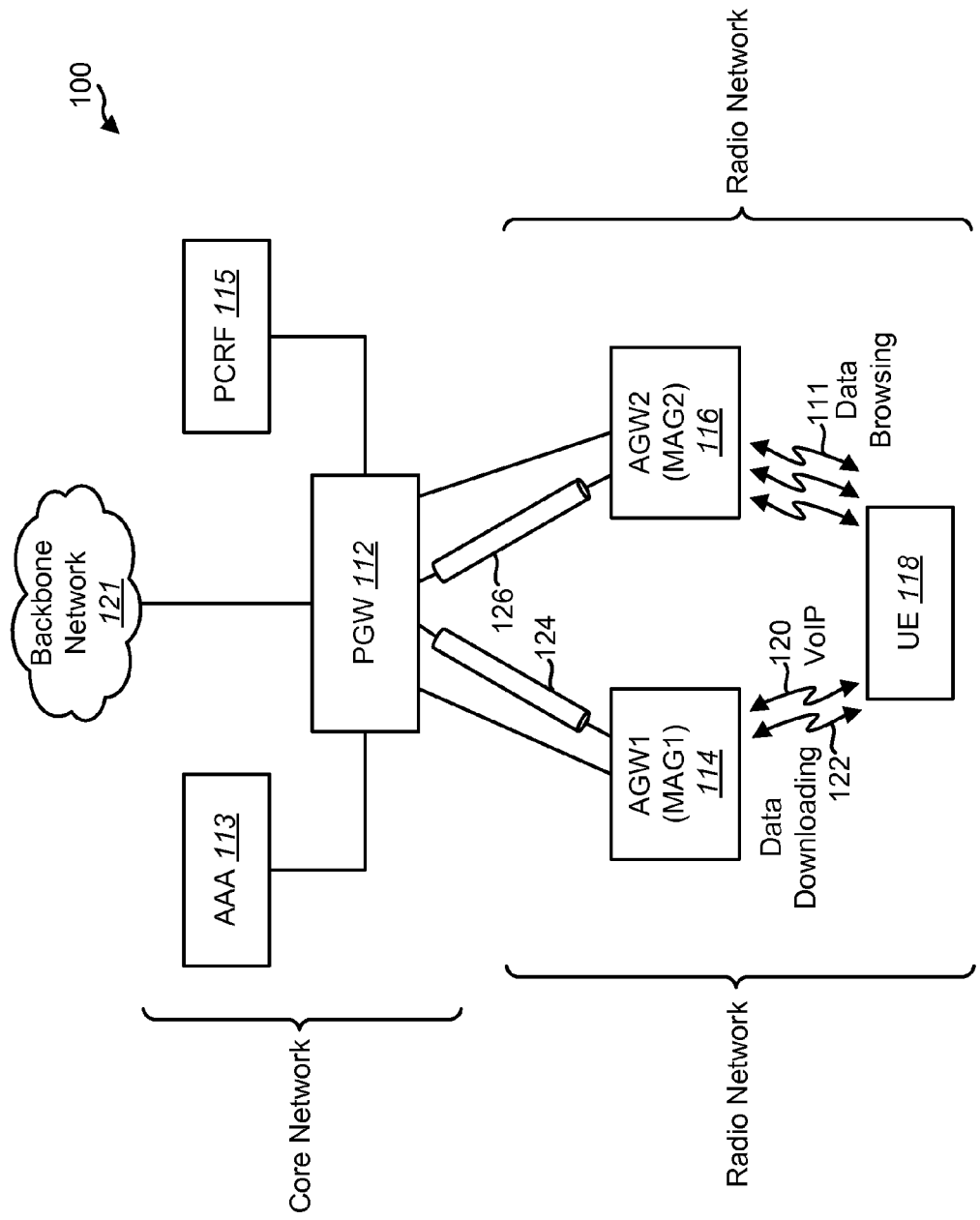
FIG. 1 illustrates a communication system in which the methods disclosed herein may be utilized.

Reference is directed to FIG. 1 which shows a communication system 100 in which the methods disclosed herein may be utilized. In FIG. 1, for the sake of simplicity and ease of description, the system 100 is simply shown as having a PDN GateWay (PGW) 112, where PDN is an abbreviation for "Packet Data Network." The PGW 112 may also be referred to as a Local Mobility Anchor (LMA) 112. The PGW 112 may be part of the core network of a Long-Term Evolution (LTE) system, for example. In this instance, the PGW 112 is connected to a first Access GateWay (AGW1) 114 and to a second Access GateWay (AGW2) 116. AGW1 114 and AGW2 116 may operate under different standards with different technologies. For example, AGW1 114 may operate under the LTE standards, and AGW2 116 may operate under a Wireless Local Area Network (WLAN) standard, the WiMAX standards, etc.

Connected to the PGW 112 is a Policy Charging Rule Function (PCRF) 115 and an Accounting Authorization Authentication (AAA) function 113. The PCRF 115 and the AAA 113 are entities employed for performing administration functions and will be described later. In addition, the PGW 112 is linked to a backbone network 121 which can be an intranet or the Internet.

In the system 100, there is a User Equipment (UE) 118 capable of migrating and communicating with the radio networks in the system 100, including the radio networks served by AGW1 114 and AGW2 116.

Suppose initially the UE 118 has multiple sessions with which data packets are exchanged with AGW1 114. For ease of description, further suppose the multi-interface link comprises a Voice over IP (VoIP) session 120 and a data downloading session 122.

An IP flow may be associated with the VoIP session 120. Similarly, an IP flow may be associated with the data downloading session 122. As used herein, the term "IP flow" may refer to a sequence of IP packets with the same header information, for example, the same 5-tuple including source and destination IP addresses, source and destination ports, and the same transport protocol. It should be understood that there are other ways to identify IP flows as well, for example, using an IPv6 flow label, or an SPI (Security Parameter Index) in IPsec headers. The mechanisms described in this application apply irrespective of how an IP flow is being identified.

Under the Proxy Mobile Internet Protocol (PMIP) as set forth by the Internet Engineering Task Force (IETF), after the UE 118 is authorized to gain access to the communication system 100 with the requested services, a data tunnel 124 is established for the data packets of the VoIP session 120 and the data downloading session 122.

Further suppose in this case, the UE 118 reaches the proximity of AGW2 116 and has favorable communication conditions with AGW2 116. It may be desirable to switch the data downloading session 122 from AGW1 114 to AGW2 116. However, it may be desirable to maintain the VoIP session 120 with AGW1 114. There are many reasons for such a selective switch. For example, the user of the UE 118 may prefer to use the technology of AGW2 116 for cost savings. However, real-time applications such as VoIP calls are not normally handed over from one access point to another even if it is possible, as this might cause interruption of service itself during the handover operation.

Heretofore, selective switching of communication sessions as mentioned in the example above has not been fully possible despite the aforementioned needs. Instead, under the current scheme as in the example above, all the sessions must be switched from AGW1 114 to AGW2 116 (in the case where the UE 118 uses a single IP address for both the VoIP session 120 and the data downloading session 122). That is, after the PGW 112 performs a Proxy Binding Update (PBU), the data tunnel 124 between AGW1 114 and the PGW 112 is switched to the data tunnel 126 established between AGW2 116 and the PGW 112. Consequently, both the VoIP session 120 and the data downloading session 122 have to go through AGW2 116. The present disclosure relates to techniques for facilitating selective switching of multiple sessions among different interfaces, where a single IP address is used for the multiple sessions.

Figure 2:
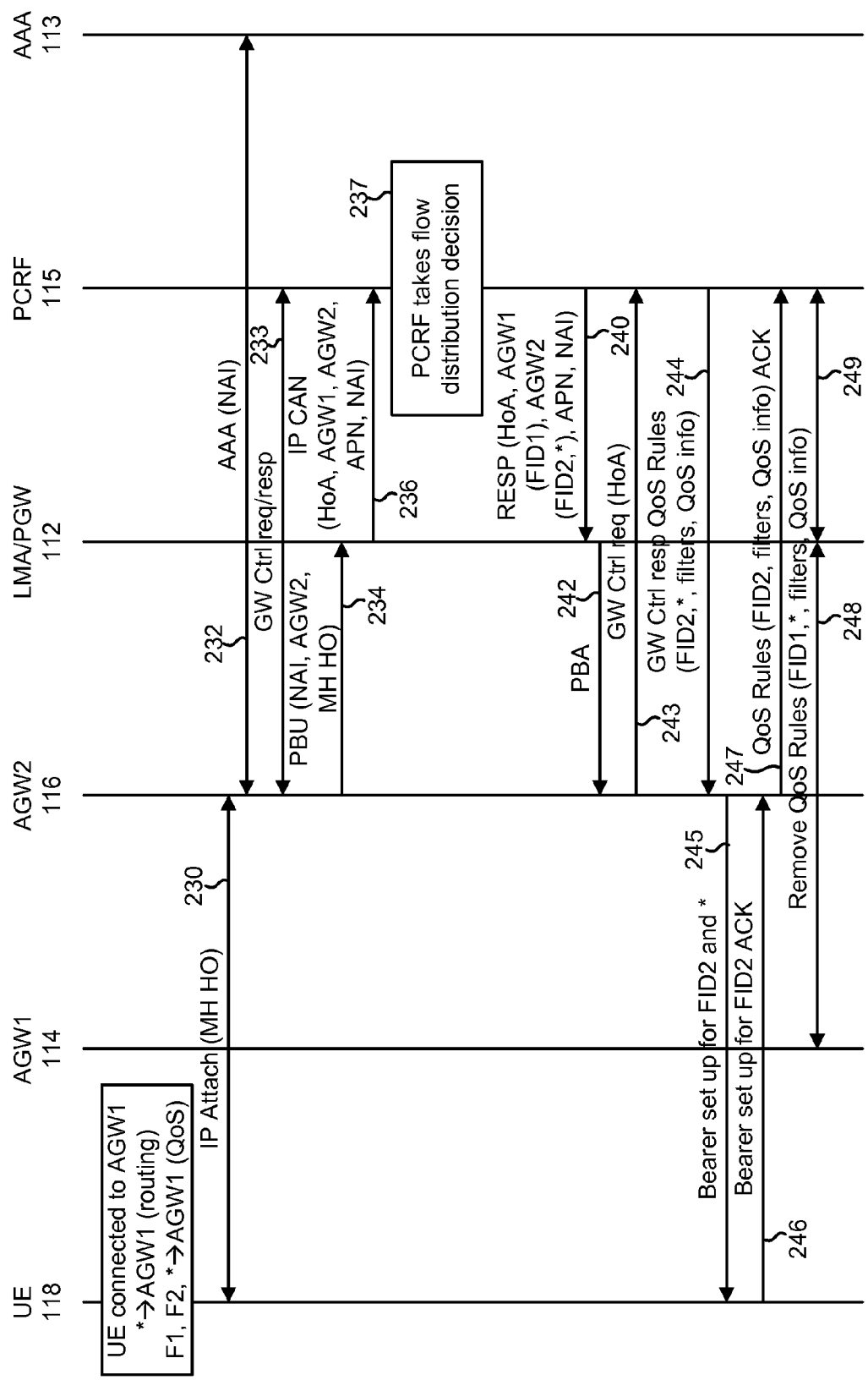
FIG. 2 illustrates the message and data flows between the UE and the various communication entities in one possible scenario for facilitating IP flow mobility in a multi-interface communication environment.

Reference is now made to FIG. 2. In FIG. 2, it is assumed that the PCRF 115 already knows that the UE 118 is exchanging data packets in the VoIP session 120 and the data downloading session 122, as those sessions are registered at bootstrap time. As mentioned earlier, to begin with, the UE 118 should register with AGW2 116. The UE 118 should be authenticated with AGW2 116 using an access-specific attachment procedure. Messages 230 may be exchanged between the UE 118 and AGW2 116 via such a procedure, as shown in FIG. 2. Thereafter, AGW2 116 performs administration functions by exchanging messages 232 with the AAA 113.

AGW2 116 and the PCRF 115 may exchange messages 233 related to QoS establishment in the link between AGW2 116 and the UE 118, which should be performed with the PCRF 115 in case of access technologies supporting bearer set up during attachment. Then AGW2 116 sends a PBU message 234 to the PGW 112 in order to set up the data tunnel 126 between AGW2 116 and the PGW 112. The PBU message 234 has the handoff indication field accordingly set in order to enable the concurrent attachment of the UE 118 to multiple AGWs 114, 116.

The PGW 112 in turn relays an Internet Protocol Connectivity Access Network (IP CAN) message 236 to the PCRF 115, asking for authorization to set up a data IP tunnel with the AGWs 114, 116. The message 236 informs the PCRF 115 that the UE 118 is requesting to be connected to AGW2 116.

In the depicted example, the PCRF 115 decides 237 to split the two sessions by assigning the VoIP session 120 to the data tunnel 124 between AGW1 114 and the PGW 112, and by assigning the data downloading session 122 to the new tunnel 126 that is going to be created between AGW2 116 and the PGW 112. Hence, the PCRF 115 sends a response 240 back to the PGW 112 acknowledging the request and providing the decided flow distribution to the PGW 112. More specifically, the response 240 includes information about the distribution of the UE's 118 IP flows among multiple AGWs 114, 116. In the depicted example, the response 240 indicates that the IP flow corresponding to the VoIP session 120 is assigned to AGW1 114, and that the IP flow corresponding to the data downloading session 122 is assigned to AGW2 116. An identifier for the IP flow corresponding to the VoIP session 120 may be specified by the designation "FID1." An identifier for the IP flow corresponding to the data downloading session 122 may be specified by the designation "FID2." The designation "*" refers to all of the UE's 118 other IP flows other than FID1 and FID2.

In turn, in order to acknowledge the PBU 234 sent before from AGW2 116, the PGW 112 sends a PBA (Proxy Binding Acknowledgement) message 242 to AGW2 116. The reception of the PBA message 242 triggers AGW2 116 to send a gateway control request message 243 to the PCRF 115. In turn, the PCRF 115 sends back a message 244 acknowledging the gateway control request 243 and providing QoS rules to AGW2 116. This message 244 contains a TFT (Traffic Flow Template) containing a flow identifier for the data downloading session 122 (which may be referred to herein as FID2) and the corresponding characterization and information telling the UE 118 to use the TFT to update its routing table. AGW2 116 and the UE 118 then perform QoS negotiation 245, 246 with the UE 118 in order to map the QoS and the corresponding TFT to the link between the UE 118 and AGW2 116. The message 245 sent by AGW2 116 to the UE 118 contains the indication used by the UE 118 to switch flow data from the data downloading session 122 to the data tunnel 126 between the PGW 112 and AGW2 116. Upon receiving this message 245, the UE 118 exploits the contained information to update its routing table, i.e., by being informed to switch packets belonging to the data downloading session 122 to AGW2 116, maintaining those packets belonging to the VoIP session 120 in the connection with AGW1 114. To acknowledge such operation with the PCRF 115, AGW2 116 sends a QoS Rules acknowledgment message 247 to the PCRF 115. The PGW 212 exchanges messages 248 with AGW1 214, and the PGW 212 exchanges messages 249 with the PCRF 215, regarding the removal of QoS rules for the data downloading session 122.

It should be noted that other ways or methods can be used to provide to the UE 118 new routing information established by the PCRF 115 instead of the QoS bearer set up messages. Such methods can be, for example, RS/RA (Router Solicitation/Router Advertisement) messages, DHCP (Dynamic Host Configuration Protocol) exchange or RSVP (Resource Reservation Protocol), etc.

In the example, only two interface sessions 120 and 122 are described while only one session 122 is transferred, it clearly is possible that other combinations are possible. For example, the UE 118 may initially have four interface sessions with AGW1 114 and later transfer three of the four sessions to AGW2 116 but still maintain one of the four sessions.

Figure 3:
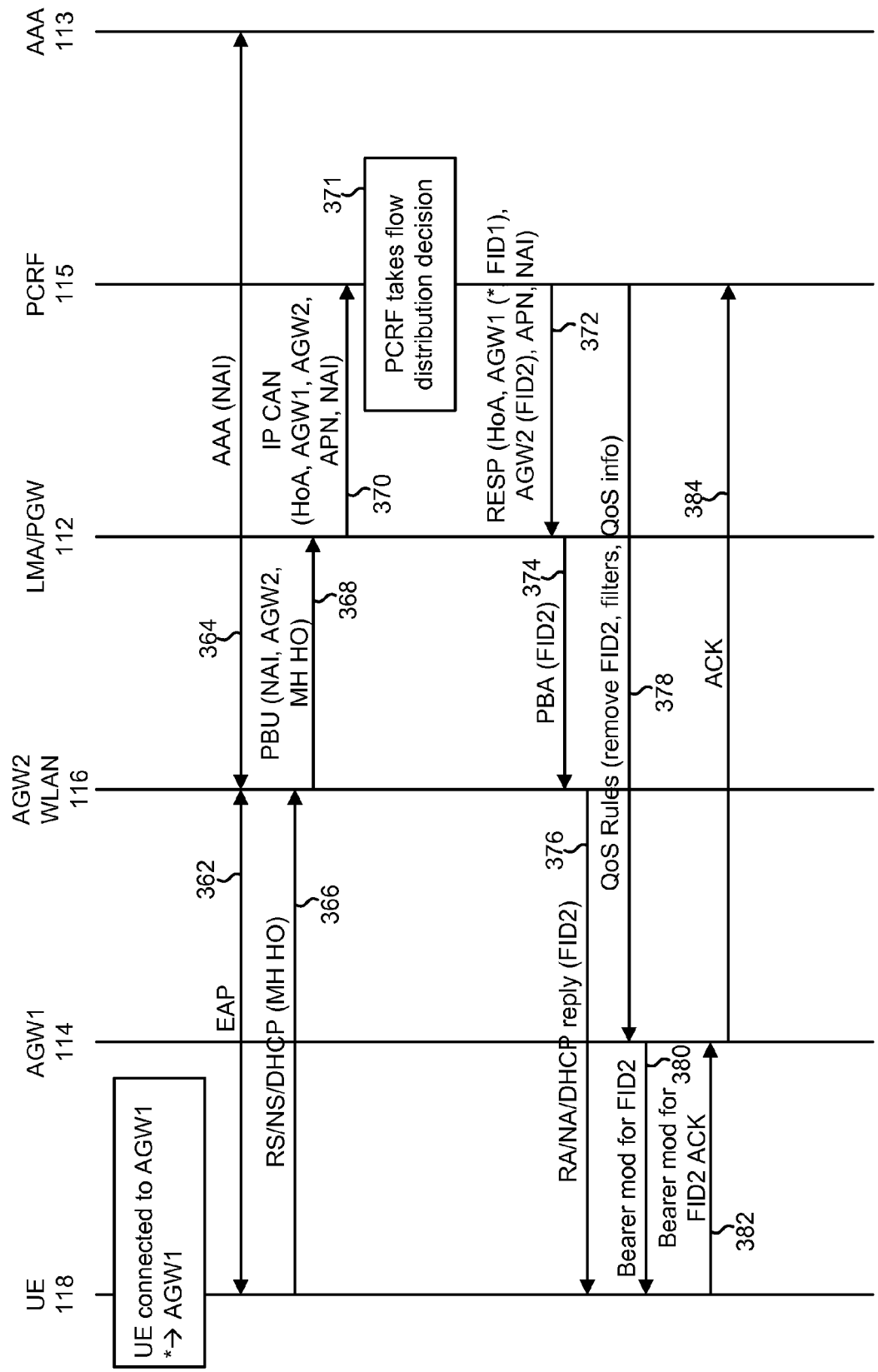
FIG. 3 illustrates the message and data flows between the UE and the various communication entities in another possible scenario for facilitating IP flow mobility in a multi-interface communication environment, where one of the Access Gateways (AGWs) is in a Wireless Local Area Network (WLAN)

The situation where the access network of AGW2 116 is bearerless (e.g., where AGW2 is part of a Wireless Local Area Network (WLAN)) is depicted in FIG. 3. The PCRF 115 already knows that the UE 118 is exchanging data packets via the VoIP session 120 and the data downloading session 122, which are registered at bootstrap time. As mentioned before, to start, the UE 118 should register with AGW2 116. Messages 362 are exchanged between the UE 118 and AGW2 116 using the Extensible Authentication Protocol (EAP) in order to authenticate the UE 118 with AGW2 116. Thereafter, AGW2 116 performs administration functions by exchanging messages 364 with the AAA 113.

After the EAP procedure, the UE 118 sends to AGW2 116 a Router Solicitation message 366 requiring an IPv6 address and connectivity for both AGW1 114 and AGW2 116. Such message in turn triggers AGW2 116 to send a PBU message 368 to the PGW 112, in order to set up the data tunnel 126 between the PGW 112 and AGW2 116. The PBU message 368 has the handoff indication field accordingly set in order to enable the concurrent attachment of the UE 118 to multiple AGWs 114, 116.

The PGW 112 in turn relays an IP CAN message 370 to the PCRF 115, asking for authorization to set up a data IP tunnel with AGW2 116. The IP CAN message 370 informs the PCRF 115 that the UE 118 is requesting to be connected to AGW2 116. Such indication can be fit in a modified event trigger AVP but other extensions are clearly possible.

The PCRF 115 then decides 371 to split the two sessions by assigning the VoIP session 120 to the data tunnel 124 between AGW1 114 and the PGW 112 and the data downloading session 122 to the new data tunnel 126 that is going to be created between AGW2 116 and the PGW 112. Hence, the PCRF 115 responds 372 back to the PGW 112 acknowledging the request and providing the decided flow distribution to the PGW 112. In turn, in order to acknowledge the PBU 368 sent before from AGW2 116, the PGW 112 sends a PBA message 374 to AGW2 116. The PBA message 374 may include FID2, which as indicated above, identifies the IP flow that is being moved to AGW2 116 (i.e., the IP flow for the data downloading session 122 in this example). For example, the PBA message 374 may include an FID mobility option whose content is FID2, as well as the correspondent flow characterization.

Triggered by the PBA message 374, AGW2 116 sends a Router Advertisement (RA) message 376 back to the UE 118, as a response to the RS message 366 sent previously. The RA message 376 includes FID2, which as indicated above, identifies the IP flow that is being moved to AGW2 116 (i.e., the IP flow for the data downloading session 122 in this example). FID2 may be inserted in an ad-hoc option.

The reception of the RA message 376 enables the UE 118 to get IP connectivity with AGW2 116 and informs the UE 118 to route packets belonging to the data downloading session 122 towards AGW2 116. It should be noted that other options or extensions to the RA message 376 can be used, and that other messages such as NS/NA, DHCP messages and RSVP signaling are suitable for the same communication and might require extensions similar to the one done with RA.

Hence by receiving the RA message 376, the UE 118 exploits the contained information to update its routing table, i.e., by being informed to switch packets belonging to the data downloading session 122 to AGW2 116, while maintaining those packets belonging to the VoIP session 120 in the connection with AGW1 114.

Concurrently, the PCRF 115 sends back a QoS rules message 378 to AGW1 114 to tear down the QoS and TFT filters related to the FID2 from the link between AGW1 114 and the UE 118. Such message triggers AGW1 114 to send a bearer modification message 380 to the UE 118. The bearer modification message 380 includes FID2, which as indicated above, identifies the IP flow that is being moved to AGW2 116 (i.e., the IP flow for the data downloading session 122 in this example).

The UE 118 sends back to AGW1 114 an acknowledgment message 382 and in turn AGW1 114 sends an acknowledgement message 384 back to the PCRF 115. The QoS rules message 378 and the bearer modification message 380 contain an extension saying to the UE 118 to remove the flow FID2 from the data tunnel 124 without closing the correspondent data downloading session 122.

It should be noted that other ways or methods can be used to provide to the UE 118 new routing information established by the PCRF 115 instead of the RS/RA messages exchange. Such methods can be for example NS/NA messages, DHCP exchange or RSVP signaling.

Figure 4:
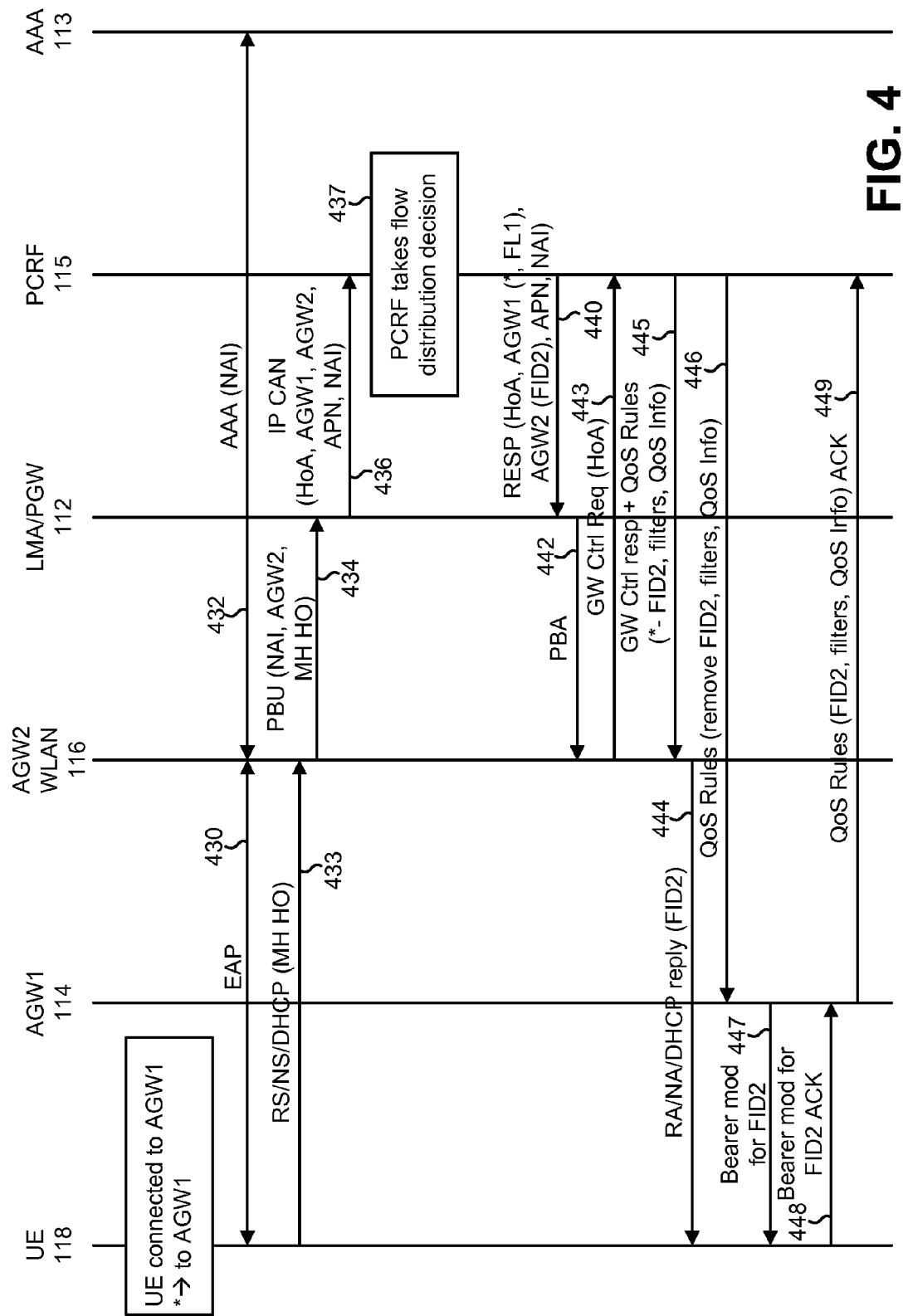
FIG. 4 illustrates the message and data flows between the UE and the various communication entities in another possible scenario for facilitating IP flow mobility in a multi-interface communication environment, where one of the AGWs is in a WLAN in which a Policy Control and Charging (PCC) function is deployed.

Reference is now made to FIG. 4. In FIG. 4, it will be assumed that AGW2 116 is part of a WLAN in which a Policy Control and Charging (PCC) function is deployed.

Messages 430 are exchanged between the UE 118 and AGW2 116 using the Extensible Authentication Protocol (EAP) in order to authenticate the UE 118 with AGW2 116. Thereafter, AGW2 116 performs administration functions by exchanging messages 432 with the AAA 113.

The UE 118 sends to AGW2 116 a Router Solicitation (RS) message 433 to AGW2 116. The RS message 433 triggers AGW2 116 to send a PBU message 434 to the PGW 112, in order to set up the data tunnel 126 between the PGW 112 and AGW2 116. AGW2 116 inserts in the PBU message 434 a FID mobility option containing the FID2 and the corresponding session description received during the EAP message exchange 430.

The PGW 112 in turn relays an IP CAN message 436 to the PCRF 115, asking for authorization to set up a data tunnel 126 with AGW2 116 and to use the data tunnel 126 to exchange data packets belonging to the data downloading session 122. The IP CAN message 436 includes the FID2 with the corresponding description. For example, the FID2 can be included as a modified or not modified TFT identifier. Other extensions can also be used.

The PCRF 115 then decides 437 to split the two sessions by assigning the VoIP session 120 to the data tunnel 124 between AGW1 114 and the PGW 112 and the data downloading session 122 to the new data tunnel 126 that is going to be created between AGW2 116 and the PGW 112. The PCRF 115 responds 440 back to the PGW 112 acknowledging and authorizing the request. In turn, in order to acknowledge the PBU message 434 sent before from AGW2 116, the PGW 112 sends a PBA message 442 to AGW2 116.

The reception of the PBA message 442 triggers AGW2 116 to send a gateway control request message 443 to the PCRF 115. In turn, the PCRF 115 sends back a message 445 acknowledging the gateway control request 443 and providing QoS rules to AGW2 116. The QoS rules are associated with FID2, which as indicated above, identifies the IP flow that is being moved to AGW2 116 (i.e., the IP flow for the data downloading session 122 in this example).

AGW2 116 sends a Router Advertisement (RA) message 444 back to the UE 118, as a response to the RS message 433 sent previously. The RA message 444 enables the UE 118 to get IP connectivity.

The PCRF 115 sends back a QoS rules message 446 to AGW1 114 to tear down the QoS and TFT filters related to the FID2 from the link between AGW1 114 and the UE 118. Such message triggers AGW1 114 to send a bearer modification message 447 to the UE 118. The UE 118 sends back to AGW1 114 an acknowledgment message 448 and in turn AGW1 114 sends an acknowledgement message 449 back to the PCRF 115.

Afterward, another data tunnel 126 between the UE 118 and AGW2 116 is established, as shown in FIG. 1. In the data tunnel 126, in this example, there are only data packets for the data downloading session 122. As for data packets for the VoIP session 120, they are still exchanged in the tunnel 124 linked between the UE 118 and AGW1 114.

It should be noted that the same procedure can be used to allocate a flow to any of the AGWs 114, 116 to which the UE 118 is attached in case the flow gets bootstrapped. Similarly, the same extensions can be used to perform network controlled switching of flows. For example, the PCRF 115 may be the entity taking the decision to move flow labeled by FID2 to AGW2 116.

It should be noted that in case the PCRF 115 is not deployed, the solution is still valid as long as the PGW 112 performs authorization exchange with another entity (this entity could be also colocated in the PGW 112 as well).

Moreover, methods used to trigger PBU/PBA exchange (e.g., Neighbor Solicitation/Neighbor Advertisement, Router Solicitation/Router Advertisement, DHCP messages, RSVP messages or messages used to set up a layer 2 connection between the UE 118 and an AGW 114, 116 if supported by access technologies) can be used to convey the information about the FID, with extensions (if necessary).

Figure 5:
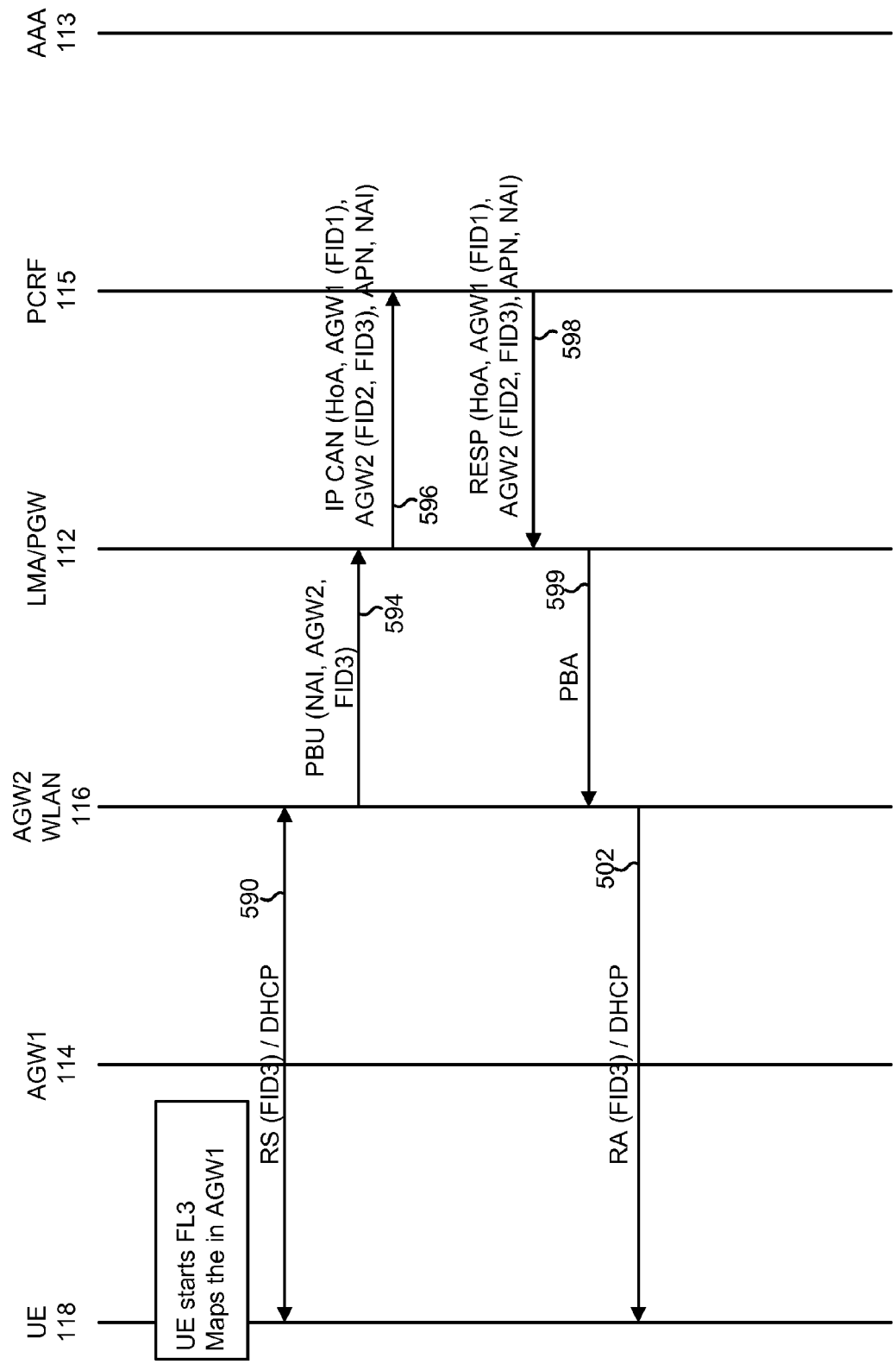
FIG. 5 illustrates the message and data flows between the UE and the various communication entities in another possible scenario for facilitating IP flow mobility in a multi-interface communication environment, where the UE initiates the set up of an additional IP flow.

Reference is now made to FIG. 5. In FIG. 5, the UE 118 is connected to AGW1 114 via the data tunnel 124, and to AGW2 116 via the data tunnel 126. In other words, the UE 118 is exchanging data flow 120 through AGW1 114 and data flow 122 through AGW2 116.

The UE 118 starts a third session, e.g., a data browsing session 111, and attempts to match the IP flow for the third session to AGW2 116, hence deciding to exchange packets belonging to that session through the data tunnel 126 between AGW2 116 and the PGW 112. In a way similar to FID1 and FID2, the UE 118 characterizes the third session and names it as FID3. In other words, FID3 identifies the IP flow that is being added (i.e., the IP flow that corresponds to the data browsing session 111) and that is being assigned to AGW2 116.

In order to map the data browsing session 111 to the data tunnel 126 between AGW2 116 and the PGW 112, the UE 118 sends a Router Solicitation (RS) message 590 to AGW2 116. The RS message 590 includes an extension containing FID3 and a corresponding characterization. This extension can be fit in an ad-hoc option but other methods such as piggybacking or extensions of already existing options can be used.

The RS message 590 triggers AGW2 116 to send a PBU message 594 containing FID3 information to the PGW 112. The PGW 112 in turn relays an IP CAN message 596 to the PCRF 115, asking for authorization to use the data tunnel 126 to exchange data packets belonging to the session 111. The IP CAN message 596 includes the FID3 and a corresponding description, which can be included as a TFT identifier (although other extensions can also be used).

The PCRF 115 responds 598 back to the PGW 112 acknowledging the request. In turn, in order to acknowledge the PBU message 594 sent before from AGW2 116, the PGW 112 sends a PBA message 599 to AGW2 116.

Finally, AGW2 116 sends a Router Advertisement (RA) message 502 back to the UE 118, as a response to the RS message 590 sent previously. The RA message 502 includes FID3, which identifies the IP flow that is being added and assigned to AGW2 116 (i.e., the IP flow for the data browsing session 111 in this example). The RA message 502 acknowledges the possibility of using AGW2 116 to perform data packet exchange for the session 111. It should be noted that other methods other than RS/RA messages can be used to perform the FID3 allocation. Among other things, examples are NS/NA messages, DHCP messages, RSVP messages or layer 2 bearer set up operations.

Figure 6:
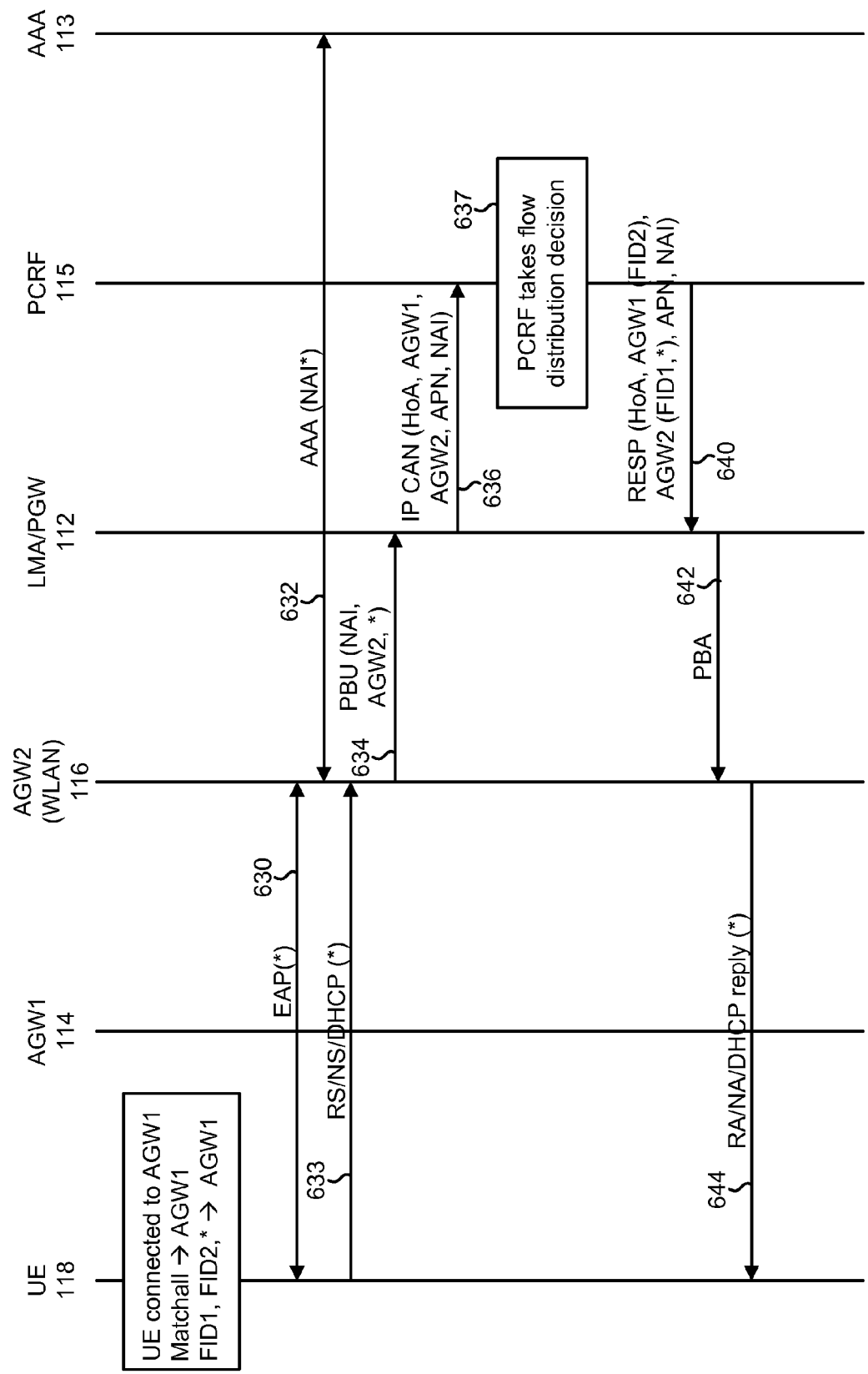
FIG. 6 illustrates the message and data flows between the UE and the various communication entities in another possible scenario for facilitating IP flow mobility in a multi-interface communication environment, where the UE notifies other communication entities that the UE intends to use a single IP address for connections to multiple AGWs.

Reference is now made to FIG. 6. In this embodiment, an indication stating that the UE 118 wants to be attached to multiple AGWs 114, 116 using a single IP address is included in one of the Extensible Authentication Protocol (EAP) messages 630. In other words, the indication has the effect of notifying AGW2 116 that the UE 118 intends to use a single IP address for connections to multiple AGWs 114, 116. The indication is designated by "*" in FIG. 6. The indication may be included in an ad-hoc attribute of the EAP response message. In addition, this can be extended to any other extension or modification of any EAP packet sent by the UE 118. Thereafter, AGW2 116 performs administration functions by exchanging messages 632 with the AAA 113.

After the EAP procedure, the UE 118 performs the message exchange required by the Internet Protocol (IP) to set up IP connectivity. Given the usage of PMIP, such procedure is described below.

The UE 118 sends to AGW2 116 a Router Solicitation (RS) message 633 requiring an IPv6 address. The RS message 633 includes an indication that the UE 118 intends to use a single IP address for connections to multiple AGWs 114, 116. As an alternative to the RS message 633 and the RA message 644, Neighbor Solicitation/Neighbor Advertisement and DHCP messages could be used.

The RS message 633 triggers AGW2 116 to send a PBU message 634 to the PGW 112, in order to set up a data tunnel 126 between the PGW 112 and AGW2 116 as depicted in FIG. 1 and without tearing down the data tunnel 124 between the PGW 112 and AGW1 114. AGW2 116 sets the Handoff Indication field to the proper value in the PBU message 634. The PBU message 634 indicates that the UE 118 intends to use a single IP address for connections to multiple AGWs 114, 116.

The PGW 112 in turn relays an IP CAN message 636 to the PCRF 115, asking for authorization to set up a data tunnel 126 with AGW2 116 without tearing down the data tunnel 124 that is already set up. The IP CAN message includes an indication stating that the UE 118 can be connected to both AGW1 114 and AGW2 116 using the same IP address. For example, an event trigger AVP with a new value could be used, but other extensions or modifications to existing extensions can similarly be used.

The PCRF 115 then decides 637 to split the two sessions by assigning the VoIP session 120 to the data tunnel 124 between AGW1 114 and the PGW 112 and the data downloading session 122 to the new data tunnel 126 that is going to be created between AGW2 116 and the PGW 112.

The PCRF 115 responds 640 back to the PGW 112 acknowledging the request. In turn, in order to acknowledge the PBU message 634 sent before from AGW2 116, the PGW 112 sends a PBA message 642 to AGW2 116. Finally, AGW2 116 sends a Router Advertisement (RA) message 644 back to the UE 118, as a response to the RS message 633 sent previously. The RA message 644 enables the UE 118 to get IP connectivity.

Figure 7:
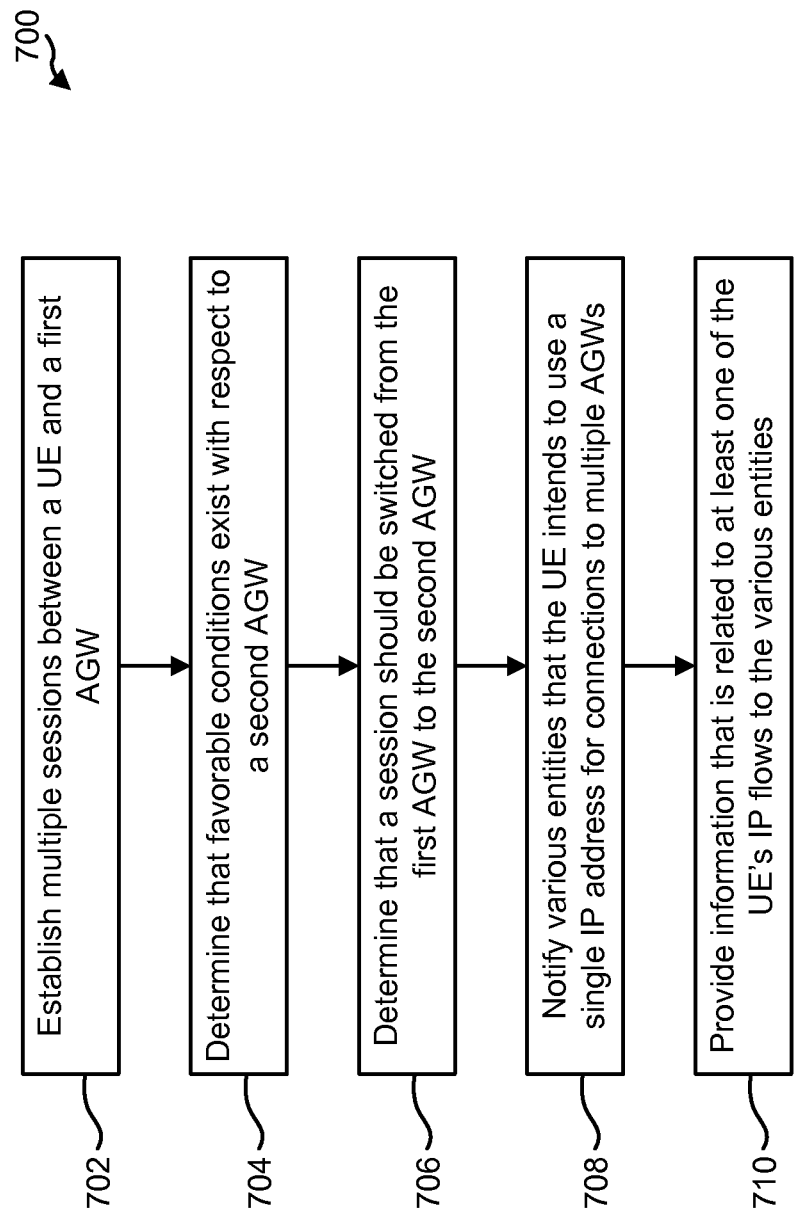
FIG. 7 illustrates a method for IP flow mobility in a multi-interface communication environment.

FIG. 7 illustrates a method 700 for IP flow mobility in a multi-interface communication environment. A UE 118 may establish 702 multiple sessions (e.g., a VoIP session 120 and a data downloading session 122) with which data packets are exchanged with a first AGW 114. At some point, the UE 118 may reach the proximity of a second AGW 116 and it may be determined 704 that favorable communication conditions with the second AGW. The first AGW 114 and the second AGW 116 may operate under different standards with different technologies.

A determination may be made 706, either by the UE 118 or by another communication entity in the network (e.g., the PCRF 115), to switch one of the sessions 120, 122 from the first AGW 114 to the second AGW 116. For example, the data downloading session 122 may be switched to the second AGW 116, whereas the VoIP session 120 may be maintained with the first AGW 114. The UE 118 and the other communication entities in the network (i.e., the UE 118, the first AGW 114, the second AGW 116, the PGW 112, the PCRF 115, and the AAA 113) may exchange messages, in the manner shown in FIGS. 2-6, that have the effect of notifying 708 the various communication entities in the network that the UE 118 intends to use a single IP address for connections to multiple AGWs 114, 116, and also 710 providing information to the various communication entities in the network that is related to at least one of the UE's IP flows.

FIG. 8 shows part of a hardware implementation of an apparatus 890 for executing the schemes or processes as described above. The apparatus 890 comprises circuitry as described below. In this specification and the appended claims, it should be clear that the term "circuitry" is construed as a structural term and not as a functional term. For example, circuitry can be an aggregate of circuit components, such as a multiplicity of integrated circuit components, in the form of processing and/or memory cells, units, blocks and the like, such as shown and described in FIG. 8.

In this embodiment the circuit apparatus is signified by the reference numeral 890 and can be implemented in any of the communication entities described herein, such as the UE 118, AGW1 114, AGW2 116, the PGW 112, the PCRF 115, or the AAA 113.

The apparatus 890 comprises a central data bus 892 linking several circuits together. The circuits include a CPU (Central Processing Unit) or a controller 894, a receive circuit 896, a transmit circuit 898, and a memory unit 899.

If the apparatus 890 is part of a wireless device, the receive circuit 896 and the transmit circuit 898 can be connected to an RF (Radio Frequency) circuit (which is not shown in the drawing). The receive circuit 896 processes and buffers received signals before sending the signals out to the data bus 892. On the other hand, the transmit circuit 898 processes and buffers the data from the data bus 892 before sending the data out of the device 890. The CPU/controller 894 performs the function of data management of the data bus 892 and further the function of general data processing, including executing the instructional contents of the memory unit 899.

The memory unit 899 includes a set of modules and/or instructions generally signified by the reference numeral 802. In this embodiment, the modules/instructions include, among other things, a flow characterization, identification and generation function 808 which carries out the schemes and processes as described above. The function 808 includes computer instructions or code for executing the process steps as shown and described in FIGS. 1-7. Specific instructions particular to an entity can be selectively implemented in the function 808. For instance, if the apparatus 890 is part of a UE 118, among other things, instructions particular to the UE 118 as shown and described in FIGS. 1-7 can be coded in the function 808. Similarly, if the apparatus 890 is part of an infrastructure communication entity, for example an AGW 114, 116, instructions particular to the aspects of the infrastructure entity as shown and described in FIGS. 1-7 can be coded in the function 808.

In this embodiment, the memory unit 899 is a RAM (Random Access Memory) circuit. The exemplary functions, such as the function 808, includes one or more software routines, modules and/or data sets. The memory unit 899 can be tied to another memory circuit (not shown) which can either be of the volatile or nonvolatile type. As an alternative, the memory unit 899 can be made of other circuit types, such as an EEPROM (Electrically Erasable Programmable Read Only Memory), an EPROM (Electrical Programmable Read Only Memory), a ROM (Read Only Memory), an ASIC (Application Specific Integrated Circuit), a magnetic disk, an optical disk, and others well known in the art.

In the above description, reference numbers have sometimes been used in connection with various terms. Where a term is used in connection with a reference number, this is meant to refer to a specific element that is shown in one or more of the Figures. Where a term is used without a reference number, this is meant to refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, firmwired circuits, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The functions described herein may be stored as one or more instructions on a computer-readable medium. The term "computer-readable medium" refers to any tangible medium that can be accessed by a computer. By way of example, and not limitation, a computer-readable medium may comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read only memory (ROM), a physical storage medium such as a compact disc (CD) or floppy disk, etc.), such that a device may obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the systems, methods, and apparatus described herein without departing from the scope of the claims.

No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A communication entity in a Proxy Mobile IP communication environment, comprising:
   means for notifying another communication entity that a wireless device intends to use a single Internet Protocol (IP) address for connections to multiple access gateways, wherein the wireless device has a plurality of IP sessions connected through a first access gateway;
   means for sending information that is related to at least one of the wireless device's IP flows to the other communication entity, wherein at least one of the plurality of IP sessions is moved to a connection with a second access gateway while at least one other of the plurality of IP sessions remains connected through the first access gateway: and
   means for performing a quality of service (QoS) negotiation between the wireless device and the second access gateway, wherein the means for performing a QoS negotiation comprises:

means for mapping QoS rules and a corresponding traffic flow template to the connection between the wireless device and the second access gateway; and means for providing information instructing the wireless device to move data packets of the at least one of the plurality of IP sessions to the connection with the second access gateway while maintaining data packets of the at least one other of the plurality of IP sessions through the first access gateway.

2. The communication entity of claim 1, wherein the communication entity is a policy charging rule function, wherein the other communication entity is a packet data network gateway, wherein the means for sending comprises means for sending a response to an IP connectivity access network message to the packet data network gateway, and wherein the response comprises information about a distribution of the wireless device's IP flows among the multiple access gateways.

3. The communication entity of claim 1, wherein the communication entity is a packet data network gateway, wherein the other communication entity is the second access gateway, wherein the means for sending comprises means for sending a proxy binding acknowledgement message to the second access gateway, and wherein the proxy binding acknowledgement message comprises identification information for an IP flow of the at least one IP session that is being moved to the second access gateway.

4. The communication entity of claim 1, wherein the communication entity is the second access gateway, wherein the other communication entity is the wireless device, wherein the means for sending comprises means for sending at least one of a router advertisement message, a neighbor advertisement message, and a dynamic host configuration protocol message to the wireless device, and wherein the router advertisement/neighbor advertisement/dynamic host configuration protocol message comprises identification information for an IP flow of the at least one IP session that is being moved to the second access gateway.

5. The communication entity of claim 1, wherein the communication entity is the first access gateway, wherein the other communication entity is the wireless device, wherein the means for sending comprises means for sending a bearer modification message to the wireless device, and wherein the bearer modification message comprises identification information for an IP flow of the at least one IP session that is being moved from the first access gateway.

6. The communication entity of claim 1, wherein the communication entity is a policy charging rule function, wherein the other communication entity is the second access gateway in which a policy control and charging function is deployed, wherein the means for sending comprises means for sending quality of service rules to the second access gateway, and wherein the quality of service rules are associated with an IP flow of the at least one IP session that is being moved to the second access gateway.

7. The communication entity of claim 1, wherein:
the communication entity is the wireless device;
the other communication entity is the second access gateway;
the means for sending information that is related to at least one of the wireless device's IP flows comprises means for sending at least one of a router solicitation message, a neighbor solicitation message and a dynamic host configuration protocol message to the second access gateway; and
the router solicitation/neighbor solicitation/dynamic host configuration protocol message includes identification information for a new IP flow that is being added by the wireless device and assigned to the second access gateway.

8. The communication entity of claim 1, wherein:
the communication entity is the second access gateway;
the other communication entity is a packet data network gateway;
the means for sending information that is related to at least one of the wireless device's IP flows comprises means for sending a proxy binding update message to the packet data network gateway; and
the proxy binding update message includes identification information for a new IP flow that is being added by the wireless device and assigned to the second access gateway.

9. The communication entity of claim 1, wherein:
the communication entity is a packet data network gateway;
the other communication entity is a policy charging rule function;
the means for sending information that is related to at least one of the wireless device's IP flows comprises means for sending an IP connectivity access network message to the policy charging rule function; and
the IP connectivity access network message includes identification information for a new IP flow that is being added by the wireless device.

10. The communication entity of claim 1, wherein:
the communication entity is the second access gateway;
the other communication entity is the wireless device;
the means for sending information that is related to at least one of the wireless device's IP flows comprises means for sending at least one of a router advertisement message, a neighbor advertisement message and a dynamic host configuration protocol message to the wireless device; and
the router advertisement/neighbor advertisement/dynamic host configuration protocol message includes information for a new IP flow that is being added by the wireless device.

11. The communication entity of claim 1, wherein:
the communication entity is the wireless device;
the other communication entity is the second access gateway;
the means for notifying comprises means for sending an extensible authentication protocol message to the second access gateway; and
the extensible authentication protocol message indicates that the wireless device intends to use the single IP address for the connections to the multiple access gateways.

12. The communication entity of claim 1, wherein:
the communication entity is the wireless device;
the other communication entity is the second access gateway;
the means for notifying comprises means for sending at least one of a router solicitation message, a neighbor solicitation message, and a dynamic host configuration protocol message to the second access gateway; and
the router solicitation/neighbor solicitation/dynamic host configuration protocol message indicates that the wireless device intends to use the single IP address for the connections to the multiple access gateways.

13. The communication entity of claim 1, wherein:
the communication entity is the second access gateway, wherein the other communication entity is a packet data network gateway;

the means for notifying comprises means for sending a proxy binding update message to the packet data network gateway; and the proxy binding update message indicates that the wireless device intends to use the single IP address for the connections to the multiple access gateways.

14. The communication entity of claim 1, wherein:

the communication entity is a packet data network gateway; and the means for notifying comprises means for sending an IP connectivity access network message to a policy charging rule function, wherein the IP connectivity access network message indicates that the wireless device intends to use the single IP address for the connections to the multiple access gateways.

15. A communication entity in a Proxy Mobile IP communication environment, comprising:

circuitry configured to:

notify another communication entity that a wireless device intends to use a single Internet Protocol (IP) address for connections to multiple access gateways, wherein the wireless device has a plurality of IP sessions connected through a first access gateway;

send information that is related to at least one of the wireless device's IP flows to the other communication entity, wherein at least one of the plurality of IP sessions is moved to a connection with a second access gateway while at least one other of the plurality of IP sessions remains connected through the first access gateway; and perform a quality of service (QoS) negotiation between the wireless device and the second access gateway, wherein the QoS negotiation comprises:

mapping QoS rules and a corresponding traffic flow template to the connection between the wireless device and the second access gateway, and providing information instructing the wireless device to move data packets of the at least one of the plurality of IP sessions to the connection with the second access gateway while maintaining data packets of the at least one other of the plurality of IP sessions through the first access gateway.

16. The communication entity of claim 15, wherein the communication entity is a policy charging rule function, wherein the other communication entity is a packet data network gateway, wherein the sending comprises sending a response to an IP connectivity access network message to the packet data network gateway, and wherein the response comprises information about a distribution of the wireless device's IP flows among the multiple access gateways.

17. The communication entity of claim 15, wherein the communication entity is a packet data network gateway, wherein the other communication entity is the second access gateway, wherein the sending comprises sending a proxy binding acknowledgement message to the second access gateway, and wherein the proxy binding acknowledgement message comprises identification information for an IP flow of the at least one IP session that is being moved to the second access gateway.

18. The communication entity of claim 15, wherein the communication entity is the second access gateway, wherein the other communication entity is the wireless device, wherein the sending comprises sending at least one of a router advertisement message, a neighbor advertisement message, and a dynamic host configuration protocol message to the wireless device, and wherein the router advertisement/neighbor advertisement/dynamic host configuration protocol message comprises identification information for an IP flow of the at least one IP session that is being moved to the second access gateway.

19. The communication entity of claim 15, wherein the communication entity is the first access gateway, wherein the other communication entity is the wireless device, wherein the sending comprises sending a bearer modification message to the wireless device, and wherein the bearer modification message comprises identification information for an IP flow of the at least one IP session that is being moved from the first access gateway.

20. The communication entity of claim 15, wherein the communication entity is a policy charging rule function, wherein the other communication entity is the second access gateway, wherein a policy control and charging function is deployed in the second access gateway, wherein the sending comprises sending quality of service rules to the access gateway, and wherein the quality of service rules are associated with an IP flow of the at least one IP session that is being moved to the second access gateway.

21. The communication entity of claim 15, wherein:

the communication entity is the wireless device;

the other communication entity is the second access gateway;

the sending information that is related to at least one of the wireless device's IP flows comprises sending at least one of a router solicitation message, a neighbor solicitation message and a dynamic host configuration protocol message to the second access gateway; and the router solicitation/neighbor solicitation/dynamic host configuration protocol message includes identification information for a new IP flow that is being added by the wireless device and assigned to the second access gateway.

22. The communication entity of claim 15, wherein:

the communication entity is the second access gateway;

the other communication entity is a packet data network gateway;

the sending information that is related to at least one of the wireless device's IP flows comprises sending a proxy binding update message to the packet data network gateway; and the proxy binding update message includes identification information for a new IP flow that is being added by the wireless device and assigned to the second access gateway.

23. The communication entity of claim 15, wherein:

the communication entity is a packet data network gateway;

the other communication entity is a policy charging rule function;

the sending information that is related to at least one of the wireless device's IP flows comprises sending an IP connectivity access network message to the policy charging rule function; and the IP connectivity access network message includes identification information for a new IP flow that is being added by the wireless device.

24. The communication entity of claim 15, wherein:

the communication entity is the second access gateway;

the other communication entity is the wireless device;

the sending information that is related to at least one of the wireless device's IP flows comprises sending at least one of a router advertisement message, a neighbor advertisement message and a dynamic host configuration protocol message to the wireless device; and the router advertisement/neighbor advertisement/dynamic host configuration protocol message includes information for a new IP flow that is being added by the wireless device.

25. The communication entity of claim 15, wherein the communication entity is the wireless device, wherein the other communication entity is the second access gateway, wherein the notifying comprises sending an extensible authentication protocol message to the second access gateway, and wherein the extensible authentication protocol message indicates that the wireless device intends to use the single IP address for the connections to the multiple access gateways.

26. The communication entity of claim 15, wherein the communication entity is the wireless device, wherein the other communication entity is the second access gateway, wherein the notifying comprises sending at least one of a router solicitation message, a neighbor solicitation message, and a dynamic host configuration protocol message to the second access gateway, and wherein the router solicitation/neighbor solicitation/dynamic host configuration protocol message indicates that the wireless device intends to use the single IP address for the connections to the multiple access gateways.

27. The communication entity of claim 15, wherein the communication entity is the second access gateway, wherein the other communication entity is a packet data network gateway, wherein the notifying comprises sending a proxy binding update message to the packet data network gateway, and wherein the proxy binding update message indicates that the wireless device intends to use the single IP address for the connections to the multiple access gateways.

28. The communication entity of claim 15, wherein the communication entity is a packet data network gateway, wherein the notifying comprises sending an IP connectivity access network message to a policy charging rule function, wherein the IP connectivity access network message indicates that the wireless device intends to use the single IP address for the connections to the multiple access gateways.

29. A method for IP flow mobility, the method being implemented by a communication entity in a multi-interface communication environment using Proxy Mobile IP, the method comprising:
notifying another communication entity that a wireless device intends to use a single Internet Protocol (IP) address for connections to multiple access gateways, wherein the wireless device has a plurality of IP sessions connected through a first access gateway;
sending information that is related to at least one of the wireless device's IP flows to the other communication entity, wherein at least one of the plurality of IP sessions is moved to a connection with a second access gateway while at least one other of the plurality of IP sessions remains connected through the first access gate; and
performing a quality of service (QoS) negotiation between the wireless device and the second access gateway, wherein the QoS negotiation comprises:
mapping QoS rules and a corresponding traffic flow template to the connection between the wireless device and the second access gateway, and
providing information instructing the wireless device to move data packets of the at least one of the plurality of IP sessions to the connection with the second access gateway while maintaining data packets of the at least one other of the plurality of IP sessions through the first access gateway.

30. The method of claim 29, wherein the communication entity is a policy charging rule function, wherein the other communication entity is packet data network gateway, wherein the sending comprises sending a response to an IP connectivity access network message to the packet data network gateway, and wherein the response comprises information about a distribution of the wireless device's IP flows among the multiple access gateways.

31. The method of claim 29, wherein the communication entity is a packet data network gateway, wherein the other communication entity is the second access gateway, wherein the sending comprises sending a proxy binding acknowledgement message to the second access gateway, and wherein the proxy binding acknowledgement message comprises identification information for an IP flow of the at least one IP session that is being moved to the second access gateway.

32. The method of claim 29, wherein the communication entity is the second access gateway, wherein the other communication entity is the wireless device, wherein the sending comprises sending at least one of a router advertisement message, a neighbor advertisement message, and a dynamic host configuration protocol message to the wireless device, and wherein the router advertisement/neighbor advertisement/dynamic host configuration protocol message comprises identification information for an IP flow of the at least one IP session that is being moved to the second access gateway.

33. The method of claim 29, wherein the communication entity is the first access gateway, wherein the other communication entity is the wireless device, wherein the sending comprises sending a bearer modification message to the wireless device, and wherein the bearer modification message comprises identification information for an IP flow of the at least one IP session that is being moved from the first access gateway.

34. The method of claim 29, wherein the communication entity is a policy charging rule function, wherein the other communication entity is the second access gateway in which a policy charging function is deployed, wherein the sending comprises sending quality of service rules to the second access gateway, and wherein the quality of service rules are associated with an IP flow of the at least one IP session that is being moved to the second access gateway.

35. The method of claim 29, wherein:
the communication entity is the wireless device;
the other communication entity is the second access gateway;
the sending information that is related to at least one of the wireless device's IP flows comprises sending at least one of a router solicitation message, a neighbor solicitation message and a dynamic host configuration protocol message to the access gateway; and
the router solicitation/neighbor solicitation/dynamic host configuration protocol message includes identification information for a new IP flow that is being added by the wireless device and assigned to the second access gateway.

36. The method of claim 29, wherein:
the communication entity is the second access gateway;
the other communication entity is a packet data network gateway;
the sending information that is related to at least one of the wireless device's IP flows comprises sending a proxy binding update message to the packet data network gateway; and the proxy binding update message includes identification information for a new IP flow that is being added by the wireless device and assigned to the second access gateway.

37. The method of claim 29, wherein:
the communication entity is a packet data network gateway;
the other communication entity is a policy charging rule function;
the sending information that is related to at least one of the wireless device's IP flows comprises sending an IP connectivity access network message to the policy charging rule function; and
the IP connectivity access network message includes identification information for a new IP flow that is being added by the wireless device.

38. The method of claim 29, wherein:
the communication entity is the second access gateway;
the other communication entity is the wireless device;
the sending information that is related to at least one of the wireless device's IP flows comprises sending at least one of a router advertisement message, a neighbor advertisement message and a dynamic host configuration protocol message to the wireless device; and
the router advertisement/neighbor advertisement/dynamic host configuration protocol message includes information for a new IP flow that is being added by the wireless device.

39. The method of claim 29, wherein the communication entity is the wireless device, wherein the other communication entity is the second access gateway, wherein the notifying comprises sending an extensible authentication protocol message to the second access gateway, and wherein the extensible authentication protocol message indicates that the wireless device intends to use the single IP address for the connections to the multiple access gateways.

40. The method of claim 29, wherein the communication entity is the wireless device, wherein the other communication entity is the second access gateway, wherein the notifying comprises sending at least one of a router solicitation message, a neighbor solicitation message, and a dynamic host configuration protocol message to the second access gateway, and wherein the router solicitation/neighbor solicitation/dynamic host configuration protocol message indicates that the wireless device intends to use the single IP address for the connections to the multiple access gateways.

41. The method of claim 29, wherein the communication entity is the second access gateway, wherein the other communication entity is a packet data network gateway, wherein the notifying comprises sending a proxy binding update message to the packet data network gateway, and wherein the proxy binding update message indicates that the wireless device intends to use the single IP address for the connections to the multiple access gateways.

42. The method of claim 29, wherein the communication entity is a packet data network gateway, wherein the notifying comprises sending an IP connectivity access network message to a policy charging rule function, wherein the IP connectivity access network message indicates that the wireless device intends to use the single IP address for the connections to the multiple access gateways.

43. A non-transitory computer-readable storage medium having stored thereon processor-executable instructions configured to cause a processor of a communication entity in a Proxy Mobile IP communication environment to perform operations comprising:
notifying another communication entity that a wireless device intends to use a single Internet Protocol (IP) address for connections to multiple access gateways, wherein the wireless device has a plurality of IP sessions connected through a first access gateway;
sending information that is related to at least one of the wireless device's IP flows to the other communication entity, wherein at least one of the plurality of IP sessions is moved to a connection with a second access gateway while at least one other of the plurality of IP sessions remains connected through the first access gateway,
performing a quality of service (QoS) negotiation between the wireless device and the second access gateway, wherein the QoS negotiation comprises:
mapping QoS rules and a corresponding traffic flow template to the connection between the wireless device and the second access gateway, and
providing information instructing the wireless device to move data packets of the at least one of the plurality of IP sessions to the connection with the second access gateway while maintaining data packets of the at least one other of the plurality of IP sessions through the first access gateway.

44. The non-transitory computer-readable storage medium of claim 43, wherein:
the communication entity is a policy charging rule function;
the other communication entity is a packet data network gateway; and
the stored processor-executable instructions are configured to cause a processor of a communication entity to perform operations such that:
sending information that is related to at least one of the wireless device's IP flows comprises sending a response to an IP connectivity access network message to the packet data network gateway; and
the response comprises information about a distribution of the wireless device's IP flows among the multiple access gateways.

45. The non-transitory computer-readable storage medium of claim 43, wherein:
the communication entity is a packet data network gateway;
the other communication entity is the second access gateway; and
the stored processor-executable instructions are configured to cause a processor of a communication entity to perform operations such that:
sending information that is related to at least one of the wireless device's IP flows comprises sending a proxy binding acknowledgement message to the second access gateway; and
the proxy binding acknowledgement message comprises identification information for an IP flow of the at least one IP session that is being moved to the second access gateway.

46. The non-transitory computer-readable storage medium of claim 43, wherein:
the communication entity is the second access gateway;
the other communication entity is the wireless device; and
the stored processor-executable instructions are configured to cause a processor of a communication entity to perform operations such that:
sending information that is related to at least one of the wireless device's IP flows comprises sending at least one of a router advertisement message, a neighbor advertisement message, and a dynamic host configuration protocol message to the wireless device; and the router advertisement/neighbor advertisement/dynamic host configuration protocol message comprises identification information for an IP flow of the at least one IP session that is being moved to the second access gateway.

47. The non-transitory computer-readable storage medium of claim 43, wherein:

the communication entity is the first access gateway;
the other communication entity is the wireless device; and
the stored processor-executable instructions are configured to cause a processor of a communication entity to perform operations such that:

sending information that is related to at least one of the wireless device's IP flows comprises sending a bearer modification message to the wireless device; and the bearer modification message comprises identification information for an IP flow of the at least one IP session that is being moved from the first access gateway.

48. The non-transitory computer-readable storage medium of claim 43, wherein:

the communication entity is a policy charging rule function;
the other communication entity is the second access gateway in which a policy control and charging function is deployed; and
the stored processor-executable instructions are configured to cause a processor of a communication entity to perform operations such that:

sending information that is related to at least one of the wireless device's IP flows comprises sending quality of service rules to the second access gateway; and the quality of service rules are associated with an IP flow of the at least one IP session that is being moved to the second access gateway.

49. The non-transitory computer-readable storage medium of claim 43, wherein:

the communication entity is the wireless device;
the other communication entity is the second access gateway; and
the stored processor-executable instructions are configured to cause a processor of a communication entity to perform operations such that:

sending information that is related to at least one of the wireless device's IP flows comprises sending at least one of a router solicitation message, a neighbor solicitation message and a dynamic host configuration protocol message to the access gateway; and the router solicitation/neighbor solicitation/dynamic host configuration protocol message includes identification information for a new IP flow that is being added by the wireless device and assigned to the second access gateway.

50. The non-transitory computer-readable storage medium of claim 43, wherein:

the communication entity is the second access gateway;
the other communication entity is a packet data network gateway; and
the stored processor-executable instructions are configured to cause a processor of a communication entity to perform operations such that:

sending information that is related to at least one of the wireless device's IP flows comprises sending a proxy binding update message to the packet data network gateway; and the proxy binding update message includes identification information for a new IP flow that is being added by the wireless device and assigned to the second access gateway.

* * * * *